(12) United States Patent
Bottacin

(10) Patent No.: US 7,754,046 B2
(45) Date of Patent: Jul. 13, 2010

(54) PROCESS FOR STRUCTURALLY JOINING MODULAR HOLLOW COLUMNS OR RODS GENERICALLY ELONGATED IN SHAPE AND THE PRODUCT OBTAINED

(75) Inventor: Giuseppe Bottacin, Saonara (IT)

(73) Assignee: Exit Engineering S.r.l., Padua (IT)

( * ) Notice: Subject to any disclaimer, the term of this patent is extended or adjusted under 35 U.S.C. 154(b) by 259 days.

(21) Appl. No.: 11/571,518

(22) PCT Filed: Jun. 23, 2005

(86) PCT No.: PCT/IT2005/000365

§ 371 (c)(1),
(2), (4) Date: Dec. 30, 2006

(87) PCT Pub. No.: WO2006/003687

PCT Pub. Date: Jan. 12, 2006

(65) Prior Publication Data

US 2008/0283176 A1 Nov. 20, 2008

(30) Foreign Application Priority Data

Jul. 2, 2004 (IT) .......................... PD2004A0175

(51) Int. Cl.
*B32B 37/00* (2006.01)
*B29C 65/00* (2006.01)
*E04H 12/00* (2006.01)
*E04B 1/00* (2006.01)
*E04G 21/00* (2006.01)
*E04G 23/00* (2006.01)
*E04C 3/00* (2006.01)

(52) U.S. Cl. ........................ 156/296; 156/293; 156/294; 156/304.2; 52/651.07; 52/745.17; 52/745.18; 52/848

(58) Field of Classification Search .................. 156/158, 156/244.13, 244.15, 244.22, 244.24, 244.25, 156/245, 293, 294, 295, 296, 304.1, 304.2, 156/391, 423, 538, 539, 556, 559, 563; 52/651.07, 52/745.17, 745.18, 848; 138/109, 177; 285/332, 285/332.1, 332.5, 334.5; 403/334, 360, 361; 264/571; 29/237; 254/29 R, 29 A
See application file for complete search history.

(56) References Cited

U.S. PATENT DOCUMENTS 2,066,419 A * 1/1937 Pfistershammer ............ 52/843

(Continued)

FOREIGN PATENT DOCUMENTS

DE 1901531 A1 * 9/1790
DE 1901531    9/1970

(Continued)

*Primary Examiner*—Richard Crispino
*Assistant Examiner*—Brian R Slawski
(74) *Attorney, Agent, or Firm*—Themis Law

(57) ABSTRACT

A process for the production of a hollow structural column or rod in polymers includes the steps of assembling two or more elongated modules, each one provided with male-female truncated cone-shaped terminal parts. The inner surface of the 'female' terminal part has a taper angle that is identical to the taper angle of the outer surface of the 'male' terminal part. The process also includes the following steps: aligning the hollow modules; preparing the male and female terminal parts for adhesive bonding and insertion in the terminal part of the adjacent, aligned module; applying, preferably at the ends, an axial compression device, so that on compression of the ends of the rod made up of the modules, each external male tapering surface adheres to and exerts a suitable pressure on the internal female tapering surface of the adjacent module; and curing the adhesive.

20 Claims, 4 Drawing Sheets

U.S. PATENT DOCUMENTS

| | | | | |
|---|---|---|---|---|
| 3,345,085 A | * | 10/1967 | Hanes | 285/27 |
| 3,541,746 A | * | 11/1970 | Scott | 52/127.12 |
| 3,606,403 A | * | 9/1971 | Medney | 285/334.4 |
| 3,639,967 A | * | 2/1972 | Brighton | 29/237 |
| 3,927,457 A | * | 12/1975 | Bickle | 29/237 |
| 4,095,825 A | | 6/1978 | Butler et al. | |
| 4,169,749 A | * | 10/1979 | Clark | 156/156 |
| 4,584,900 A | | 4/1986 | Masuda | |
| 4,635,500 A | | 1/1987 | Overcashier | |
| 4,853,172 A | | 8/1989 | Jacaruso | |
| 4,986,949 A | * | 1/1991 | Trimble | 264/258 |
| 5,285,614 A | * | 2/1994 | Fouad | 52/848 |
| 5,853,651 A | * | 12/1998 | Lindsay et al. | 264/512 |
| 5,858,493 A | * | 1/1999 | Sandt | 428/36.91 |
| 6,155,017 A | * | 12/2000 | Turner | 52/848 |
| 6,167,673 B1 | * | 1/2001 | Fournier | 52/848 |
| 6,191,355 B1 | * | 2/2001 | Edelstein | 174/45 R |
| 6,340,509 B1 | * | 1/2002 | Nelson et al. | 428/34.7 |
| 6,458,309 B1 | * | 10/2002 | Allen et al. | 264/319 |
| 6,851,247 B1 | * | 2/2005 | Turner et al. | 52/309.4 |

FOREIGN PATENT DOCUMENTS

| | | |
|---|---|---|
| DE | 1784668 | 3/1971 |
| GB | 568065 | 3/1945 |
| GB | 1105133 | 3/1968 |
| JP | 2003334836 | 11/2003 |

* cited by examiner

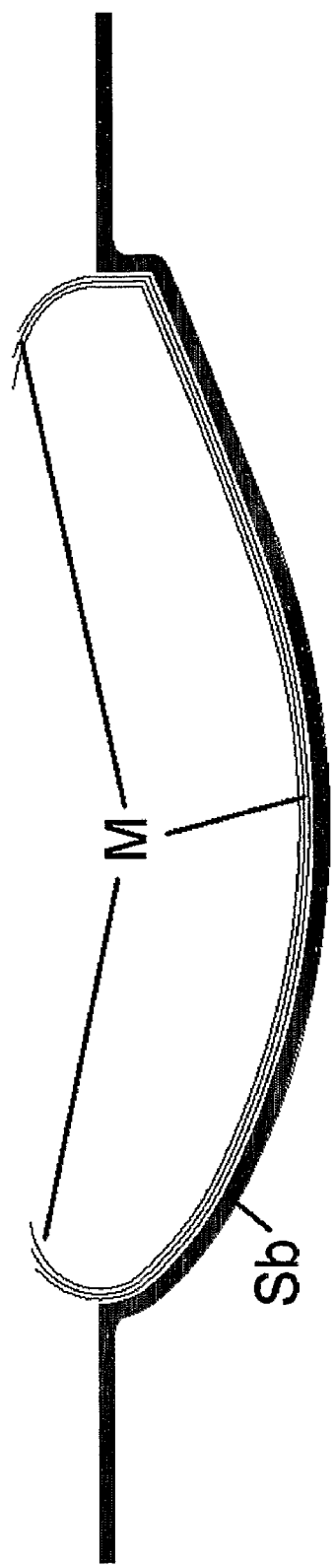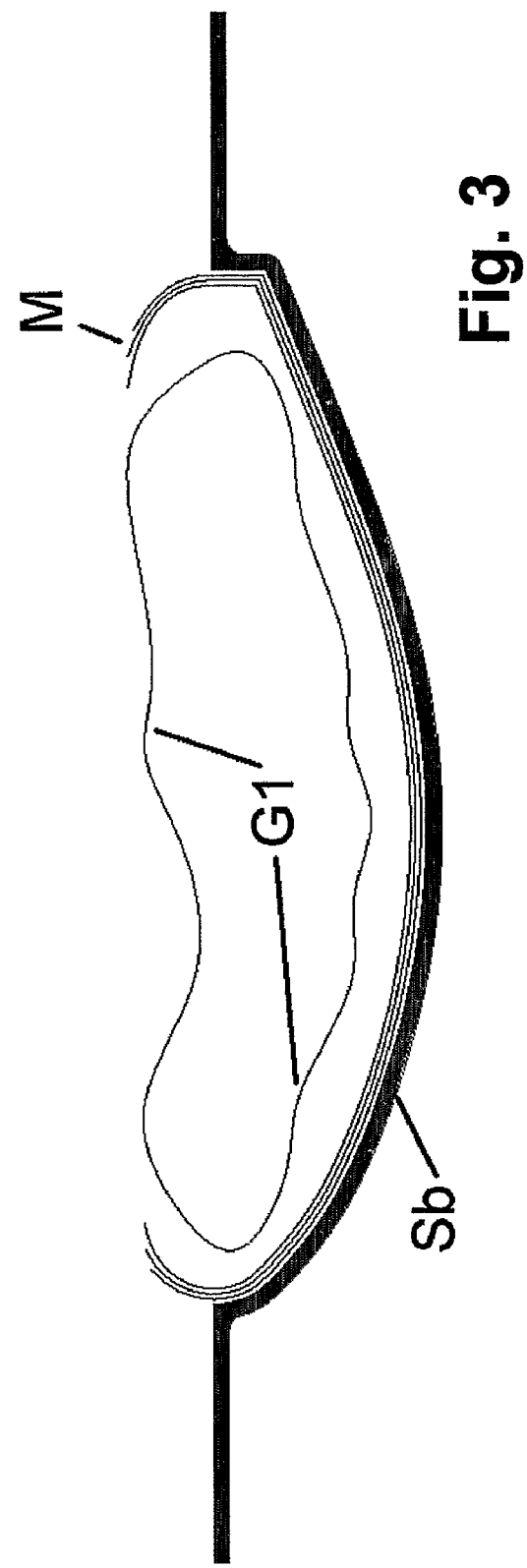

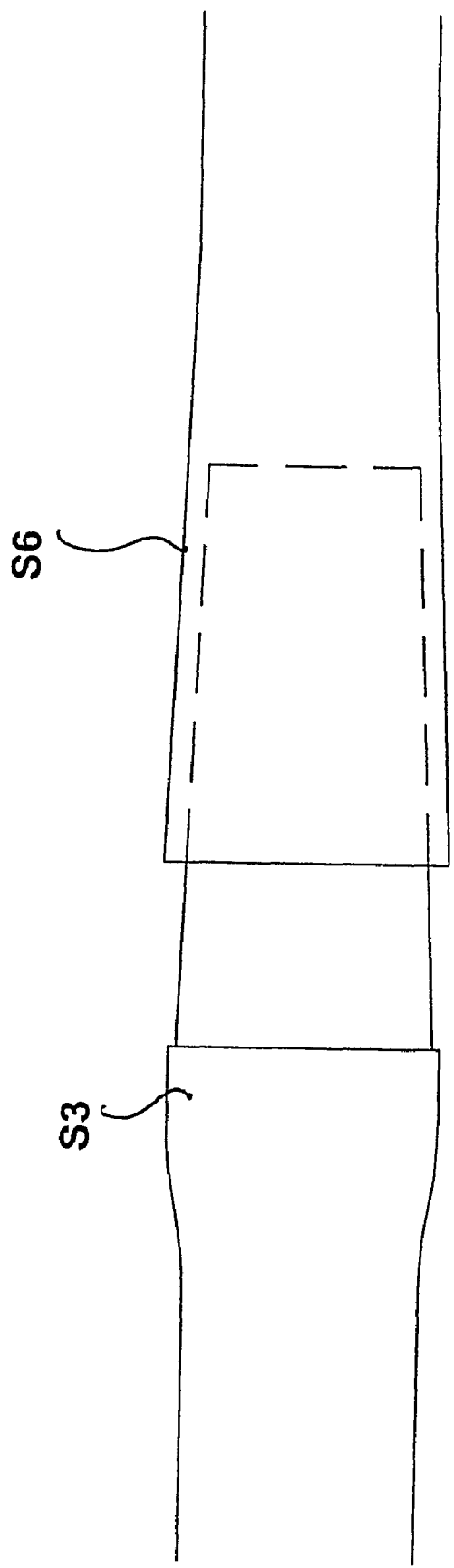

PROCESS FOR STRUCTURALLY JOINING MODULAR HOLLOW COLUMNS OR RODS GENERICALLY ELONGATED IN SHAPE AND THE PRODUCT OBTAINED

TECHNICAL FIELD

The present invention concerns the production of hollow columns or rods in polymeric materials, reinforced with fibers or not, to be used for any application where a support column is required, for example, but not exclusively, as support for electric lines, lighting installations, overhead platforms, and, in particular, concerns the production of masts in resin reinforced with fibers for sailboats. The present invention also concerns a method suitable for structurally joining elongated modules, constituting just a section of the entire length of the column or rod, which is easy to transport. Such modules can be equal to or different from one another and can be produced in series, at the same time maintaining the adaptability of the entire column or rod to the needs of any specific application.

General Notes on the Production of Composite Materials

Many objects are made of composite material consisting of a thermosetting resin, usually an epoxy resin, reinforced with fibers, usually carbon or glass or aramidic fibers. The layers of fiber, impregnated by hand or pre-impregnated with resin, are arranged on the internal surface of a mold. The resin is then heat-polymerized, in such a way as to obtain a solid whose external shape is identical to the internal surface of the mold. To obtain composite materials with excellent mechanical properties it is fundamental to eliminate any air that may be included between the various layers of fiber and to make these layers of fibers adhere strongly to one another.

To achieve this purpose, the mold with the laminated layers of fibers and resin is enclosed in a bag which is then placed in an autoclave.

The bag containing the mold and the laminate is connected to a vacuum pump, while pressure in the autoclave is brought to a suitable value.

As a result the laminate of fibers and resin is crushed against the mold and at the same time any air that may have been trapped between the fibers and the resin is extracted. To obtain materials with excellent mechanical properties it is of fundamental importance to eliminate the air which remains trapped between the various reinforcing layers during lamination.

It is also fundamental to place the various layers of fibers in close contact with one another.

These results are obtained by applying high pressures, up to 6-7 bars. Furthermore, many resins require high temperatures to polymerize correctly. In the case of very long structures, like the masts of sailboats, the cost of the autoclave necessary to obtain optimal pressures and temperatures is very high. Furthermore, the molds necessary to make masts for sailboats are large and heavy and consequently costly and difficult to handle. Another problem is represented by the inspection of the fibers during the lamination of very long pieces and by the positioning of any internal components.

Aim of the Invention

To overcome all these drawbacks, a new process for the production of hollow rods in modules has been studied.

The aim of the new process is to obtain elongated hollow objects, in resin reinforced with fibers, treated/cured at high pressure and temperature, typically in autoclave.

Another aim of the new process is to obtain long objects starting from shorter modules produced with various technologies and materials, and joined using a reliable method that doesn't affect the structural characteristics required.

Another aim of the process is to obtain elongated hollow objects with internal cross reinforcements that increase the stability of their walls.

A further aim of the process is to obtain long objects, starting from short modules that are easy to transport and that can be joined without using costly and cumbersome equipment, even away from the place where the single modules were produced.

A further aim of the process is to obtain modules that can be easily and economically transported anywhere to make up a longer object, which would be difficult to transport, without using specific equipment.

Another aim of the process is to obtain modules that can be produced in series and assembled according to different combinations, thus allowing the customization of the column or rod, for example by varying its length, or the shape of its ends, or installing couplings or supports in different positions, with no need to carry out any tools or equipment specifically for this purpose.

These and other aims, direct and complementary, are achieved by the new process for the production of modular columns or rods.

BRIEF DESCRIPTION OF THE DRAWINGS

FIG. 2 shows layers of fibre and resin for making the module laid in one of the half-moulds.

FIG. 3 shows a tubular bag placed inside the half-mould for compressing the layers of fibre and resin.

FIG. 5 shows the coupling of the male terminal part of one module to the adjacent female terminal part of another module.

DESCRIPTION OF THE INVENTION

Figure 1:
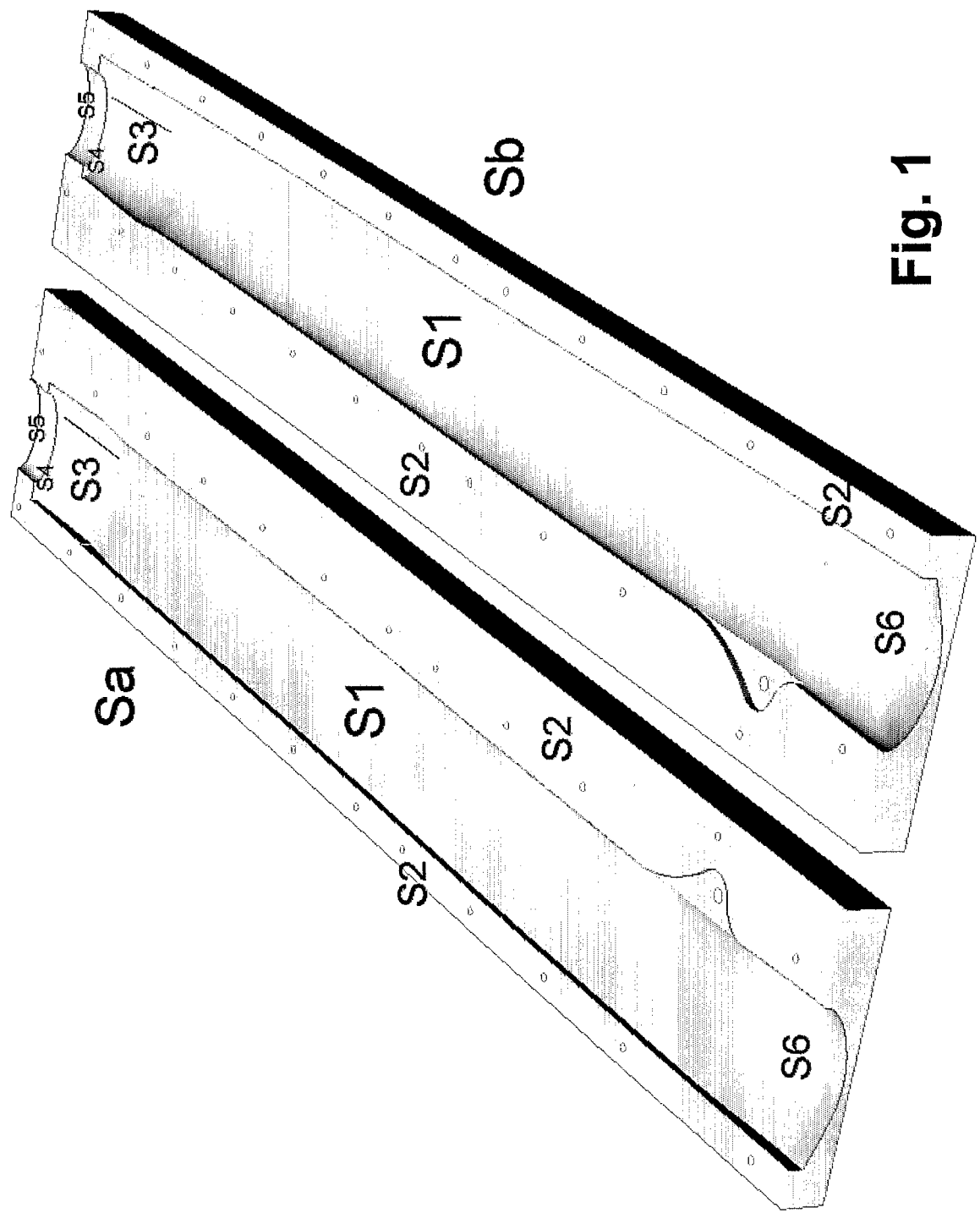
FIG. 1 shows two half-moulds for making a module according to the present invention.

The particular application described herein is suitable for the production of masts for sailboats, but it may be used to produce posts for road lights and for electric energy, for platform supports, for columns and in general for any elongated hollow structure, with any cross section (circular, elliptic, with an aerodynamic profile, etc.) and with any length. The invention makes it possible to carry out and transport this type of structure in separate modules, unlike other processes that require the construction of a single piece. The special feature of the invention lies in that it ensures a more precise quality control on the joints between the different modules compared to traditional methods. Thanks to the joining method proposed, the adhesively bonded areas constitute a local reinforcement for the column in its entirety, instead of an area of potential structural weakness.

The new process makes it possible to produce modular elongated hollow structures, in resin reinforced with fibers and polymerized at high pressure. The advantage offered by this method is represented by the fact that it allows components with reduced length to be joined in a controlled way, without penalizing the structural characteristics of the assembly, to obtain rods having the desired length. The high-pressure treatment/curing of masts made of composite material in autoclave offers considerable advantages compared to the treatment/curing at atmospheric pressure or only with a bag under vacuum and the method described herein allows said treatment/curing process to be carried out in autoclaves of limited length, not expressly meant for treating/curing masts, also benefiting from a method for joining the modules where the structural resistance of the finished mast is not penalized, but, rather, a local reinforcement that reduces the instability of the walls is created.

In the variant described herein, in fact, the advantage of adhesive bonding under pressure surfaces that are perfectly coupled is combined with the presence of transversal diaphragms that limit deformations that are perpendicular to the surface of the wall, thus reducing the risk of local instability of the wall itself. These diaphragms, which cannot be obtained in a monolithic tubular structure, are in any case difficult to insert even in a normal tubular structure constituted by two elements joined in the middle. With the proposed method, instead, the presence of these diaphragms is automatic, if the modules are produced with a perimetric rib at one end.

With the new process separate modules can be produced, whose length can be chosen according to the length of the autoclave to be used and to the characteristics of the column to be obtained by joining them. These modules can be equal to one another, in which case, once joined, they will constitute a tubular shape with substantially constant cross section, but can also have different features, for example have tapering parts for the mast ends, different types of inserts and couplings for the installation of accessories, or terminal elements for the base or the top of the mast. It is also possible to produce without difficulties a totally or partially sealed tight module, or a module containing a foamed material, in order to achieve a reserve buoyancy that is useful to prevent sailboats from overturning.

For a partially serialized production of masts for sailboats, few molds with reduced dimensions and limited costs can be prepared, with which it is possible to obtain masts having different lengths and characteristics, according to the customer's needs, and equipped with all the complements that usually must be installed later on.

The fundamental feature that ensures that the joint is structurally and economically advantageous is the shape of the terminal part of the modules.

The terminal parts of the modules must be in the shape of a truncated cone, with dimensions suitable for introducing one terminal part into the other. In this way, an axial compression, which can be easily obtained by using a traction cable or rod with threaded ends that is made slide inside the mast, is converted into a pressure perpendicular to the adjacent surfaces of the terminal parts in the shape of truncated cones.

This pressure can be easily controlled by controlling traction on the inner cable, for example using a torque wrench on nuts screwed to the threaded ends of the cable and acting on suitable retaining plates at the ends of the mast.

The pressure on the walls of the truncated cone-shaped terminal parts of the modules can thus be adjusted according to the characteristics of the adhesive used for joining the modules, thus allowing said adhesive to be perfectly treated/cured.

The pressure also allows any excess adhesive or any air bubbles to be eliminated. The excessive thickness of the adhesive and the presence of air bubbles inside it are the two main sources of defects in the glued joins and are normally avoided by applying high pressures on the surfaces to be joined. The method proposed herein ensures easy application of pressure on the surfaces to be glued together, with no need to use costly equipment or to adopt complex solutions.

Another effect of the pressure on the truncated cone-shaped terminal parts of the modules is that they are forcedly positioned on a common axis, so that the mast will necessarily be rectilinear, thanks to the self-centering properties of the tapering terminal parts. With this type of coupling, the truncated cone-shaped "female" terminal part of each module must be free from protrusions preventing the insertion of the "male" terminal part of the successive module, thus being completely open.

The "male" terminal part, instead, may be provided with a collar or a rib that stiffens and strengthens its wall in a direction perpendicular to it. Said reinforcing collar or rib is useful to stiffen the walls perpendicularly, in order to reduce their local instability. This phenomenon, which is typical of thin shell-like structures, constitutes one of the main causes of breakage of masts of sailboats and limiting it means increasing safety. The construction of the modules in this example follows, but not necessarily, the normal processes for the manufacture of products in composite material treated/cured in autoclave and requires the use of a mold in two parts divided longitudinally along one of the meridians of the module.

Each of the two halves of the mold, which is also called half-mold, reproduces in the negative one half of the outer surface of the module.

The two coupled half-molds reproduce the entire outer surface of the module. Both half-molds are provided with flanges for reciprocal coupling.

Layers of fibers impregnated with resin are laid inside the grooves in the mold of the object to be obtained, properly treated in order to facilitate the detachment of said fibers. In one of the half-molds the layers of fibers and resin are laid up to the edge for coupling with the other half-mold, while in the opposite half-mold the layers of fibers and resin project beyond said coupling edge.

A tubular bag preferably, but not necessarily, open at both ends is placed in this half-mold with projecting layers, on top of the layers of fibers and resin and inside the form to be obtained. The open ends of said tubular bag are arranged so that they come out of the terminal holes present in the mold. The diameter of each tubular bag is equal to or greater than the maximum diameter of the internal sections of the module, in such a way as to ensure the total filling of the hollow internal volume.

The projecting part of said layers of fiber and resin is folded and laid on top of said tubular bag.

The two half-molds are joined together and the whole mold is enclosed in an external bag to which the free ends of the tubular bag positioned inside the mold are joined with a special sealing agent.

In this way the tubular bag and the external bag form a continuous closed nylon bag, inside which there is the mold with the fibers and the resin to be polymerized. According to a possible variant, a single tubular bag may be used, whose diameter exceeds the maximum external lateral length of the mold and whose length is more than twice the length of the mold. This bag is partially inserted in the mold as described above, and more than half of the bag is made project from one of the terminal holes of the mold. The projecting part is turned inside out, after the mold has been closed, in such a way as to cover the outer surface of the mold itself. At the end of this operation, the two terminal openings of the bag will be overlapped right out of one of the mold openings and therefore it will be possible to join and seal them together.

This variant allows one single sealing operation to be carried out on the bag, instead of two sealing operations, but in this case the bag must be handled much more, which results in an increased risk of breaking the bag itself.

The closed volume created by the bags is placed under vacuum by means of a suction pump that is connected in a suitable position along the outer surface of the mold and creates vacuum inside it, compressing the internal bag against the layers of fiber, which in turn are compressed against the internal wall of the mold.

The assembly of the two half-molds joined in this way and contained in the bag is then placed in an autoclave, where the pressure at which the layers are compressed is increased, typically up to 6-7 bars.

In particular, the projecting part of the layers of fiber and resin laid in one of the half-molds is compressed onto the layers of fiber and resin laid in the other half-mold, so as to obtain a continuous join between the layers of fiber and resin of the two half-molds. The pump connected to the bag extracts both the air present inside the bag and the air that may have been trapped between the layers of fiber and resin or between said layers and the inside of the half-molds during lamination.

It is possible to use half-molds with coupling edges that can be sealed together, so as to avoid the use of the external bag, by sealing the internal bag against the outer walls of the mold. This solution, though requiring the construction of more complex molds, ensures time and cost savings during production.

At the end of the polymerization process, after the pumps have been switched off and the molds opened, the module is drawn out of the molds.

The module obtained has no joining lines, the layers of fiber and resin corresponding to the two half-molds are perfectly joined and compressed along the entire internal surface, and the external surface of the module has no visible joins.

All the modules necessary to obtain the complete mast can be produced using the process chosen, independently of whether they are equal to or different from one another. In the latter case, different molds must be used or, alternatively, removable inserts must be positioned in the molds, so that modules with different characteristics can be obtained. In any case, each module must have one (if the module is going to make up one of the two ends of the mast) or two truncated cone-shaped terminal parts, which must be compatible with the terminal parts of the adjacent module. In order to allow the mast to be obtained by joining the modules with a single operation, the taper of each terminal part must be identical, so as to ensure the same pressure on each coupling surface.

Once all the necessary modules have been obtained, their coupling surfaces must be properly treated for the adhesive bonding operation, eliminating any impurities and chemical compounds that may prevent perfect adhesion. This treatment is often carried out through surface abrasion.

At this point all the modules should be aligned, bringing the truncated cone-shaped terminal parts close to one another, however without coupling them. In this phase the traction cable or rod may easily be inserted, making it pass from one module to the other, without applying any tension.

Successively, the adhesive is applied to both surfaces of each terminal part to be glued and the terminals are first coupled manually, by fitting them one into the other. Once all the terminal parts have been inserted, the threaded part of the inner cable or rod is passed through the central holes of two plates that must rest on the mast ends and at this point it is possible to start tensioning the cable with two nuts.

The pressure exerted on the coupling surfaces must be sufficient to eliminate any excess adhesive and air bubbles and to ensure that the thickness of the adhesive is as indicated by its manufacturer. The correct pressure is usually suggested by the manufacturer of the adhesive used.

Common trigonometric equations make it possible to calculate the exact cable tension necessary to obtain the required pressure on the surfaces to be glued. The common formulas for threaded couplings, instead, make it possible to calculate the driving torque that must be applied to the nuts to obtain the required tension.

The application of the calculated tension allows the modules to be strongly pressed against one another. The taper of the terminal parts will also impose the alignment of the modules along the longitudinal axis of the mast, thus ensuring its rectilinearity.

Finally, once the necessary pressure has been reached, the terminal parts can be heated up to the temperature necessary to treat/cure the adhesive. Therefore, there is no need to carry out complex temperature controls on a wide area, as would be necessary if two half-masts obtained from two open half-molds were to be joined longitudinally, which is often the case in the production of boat masts in composite material.

BEST MODE FOR CARRYING OUT THE INVENTION

The characteristics of the new process for the production of modular hollow columns or rods, and the product obtained will be better explained by the following description with reference to the drawings, said drawings being enclosed purely as an example without limitation and referring to the production of modules in resin reinforced with fibers and polymerized at high pressure.

The following description refers to the production of a sailboat mast, but the considerations made apply to the production of any other rectilinear hollow object, generically tubular in shape and not necessarily made of resin reinforced with fibers and polymerized at high pressure.

FIG. 1 shows the two half-molds (Sa, Sb) with the inside groove (S1) reproducing in the negative the external surface of a generic module.

Each half-mold (Sa, Sb) is provided with flanges or edges (S2) for coupling with the other half-mold (Sb, Sa).

The seat for the truncated cone-shaped terminal parts is visible on each one of the two half-molds. At one end there is the male terminal part (S3), which includes the rib (S4) and the central opening (S5), while at the other end there is the female terminal part (S6), completely open towards the outside.

Both molds (Sa, Sb) are covered with detaching agents, that is, products that facilitate the detachment of the object in fiber and resin made with the half-molds (Sa, Sb) from the half-molds themselves.

Layers of fiber and resin (M) are laid in the grooves (S1) of the two half-molds (Sa, Sb), and are arranged so as to obtain the desired fiber thickness and layout on the walls of the object to be carried out.

In particular, in one half-mold (Sa) the layers of fiber and resin (M) are laid until reaching the surface of the half-mold (Sa) that is to be coupled with the complementary half-mold (Sb), while in the other half-mold (Sb) the layers of fiber and resin (M) are laid so that they project, in a suitable amount, beyond the coupling surface of the half-mold (Sb), as can be seen in the cross section shown in FIG. 2.

Successively, a tubular bag (G1) made of a plastic material resistant to high temperatures, typically polyamide or nylon, is placed inside the half-mold (Sb) with projecting layers of fiber and resin (M), said bag being open at both ends and said ends being arranged so that they protrude from the openings (S5, S6) present in the mold (Sb). Said tubular bag (G1) is cylindrical in shape and its diameter is equal to or greater than the maximum internal cross section of the object to be made and is positioned in such a way as to occupy all the space inside the object to be made.

FIG. 3 schematically represents the position of said tubular bag (G1).

The projecting part of the layers of fiber and resin (M) is laid on top of the tubular bag (G1) and the two half-molds (Sa, Sb) are joined and closed together.

The mold (5), constituted by the two joined half-molds (Sa, Sb), is enclosed into a tubular bag, hereinafter called external bag for the sake of simplicity, so that the two mouths of the tubular bag (G1), projecting from the openings (S5, S6) of the mold (S), are aligned with the mouths of the external bag.

Said mouths of the internal (G1) and external bag are joined and sealed with a special sealing agent.

One or more valves suitable for connection with a vacuum pump are positioned on the external bag.

The assembly made up of the mold (S) and of the internal (G1) and external bag is placed in an autoclave and the bags (G1, G2) are connected to a suction pump by means of said valves, thus extracting the air from the bag assembly (G1, G2).

Furthermore, the atmosphere of the autoclave acts on the bag (G1) inside the mold (S) and on the layers of fiber and resin (M), so that all the layers of fiber and resin (M) are compressed towards the walls of the inner groove (S1) of the two half-molds (Sa, Sb). In particular said expansion of the internal bag (G1) involves also the compression of the projecting part of the layers of fiber and resin (M) laid in the half-mold (Sb) onto the layers of fiber and resin (M) of the other half-mold (Sa), in such a way as to obtain a continuous join between the layers of fiber and resin (M) of the two half-molds (Sa, Sb). The suction pump extracts the air from the inside of the external bag. The air present inside the mold (S) and between the layers of fiber and resin (M) filters outside the mold (S) itself and is sucked by said suction pump.

Instead of an internal bag (G1) initially separated from the external bag and successively joined to it by means of a special sealing agent applied to both ends, as described above, it is possible to use a single bag (G), with a cross section sufficient to completely surround the outside of the mold (S) and with a length more than twice the length of the mold (S). In this case, approximately one half of this bag (G) would be introduced in the half-mold (Sb), in the same way described for the internal bag (G1), letting the other end protrude from one of the two openings (S5 or S6) of the mold (S). Once the two half-molds (Sa, Sb) have been joined and closed, the protruding part of the bag (G) would be turned inside out, in such a way as to cover the outside of the mold (S). In this case, there is only one end of the bag to be sealed, the other end being constituted by a fold of the bag (G) itself. As to the other aspects, the method is equivalent to the one already proposed. An equivalent solution involves the use of half-molds (Sa, Sb) that can be sealed together so as to avoid the use of the external bag. The internal bag (G1) that comes out of the two ends (S5, S6) of the mold (S) is widened and its edges are sealed around the openings of the mold (S5, S6).

The two half-molds (Sa, Sb) are sealed along their joining line, so as to create a closed chamber coinciding with the mold (S), and the air is sucked out of the mold (S), by connecting the pump to one or both the protruding ends of the internal bag (G1). Said second solution, though maintaining the internal bag (G1), avoids the use of the external bag.

The layers of fiber and resin (M) laid in the two half-molds (Sa, Sb) will be perfectly joined and compressed along their entire internal surface.

The internal bag (G1) ensures the compression and the adhesion between the various layers of fiber and resin (M), as well as between the edges of the layers (M) of a half-mold (Sa) and the edges of the layers (M) of the complementary half-mold (Sb). The construction method described above uses already known technologies for the manufacture of products in composite materials with treatment/curing of the resin in autoclave and makes it possible to obtain a module having the best structural characteristics obtainable with composite materials in resin reinforced with fibers. This process must be repeated for a number of times corresponding to the number of modules necessary to obtain the desired mast.

The single modules, however, can also be carried out with technologies different from the one described, for example they can be produced using the method known as filament-winding, or through manual impregnation of the fibers, or using thermoplastic instead of thermosetting resins. The polymerization of the resin can be carried out with or without application of pressure. The polymerization can be obtained at temperatures different from the one indicated and even without using the bag under vacuum.

The modules need not be produced with the same mold (S), in fact different molds can be used to make, for example, the base or top module of the mast, or any module provided with couplings for the mast support cables or for the sailing equipment, as shown in FIG. 1. The application of the invention described herein allows a wide range of different features of the single modules to be obtained. The only condition to be respected is that all modules must be provided with truncated cone-shaped terminal parts (S3, S6), which are necessary for coupling them with the adjacent modules. The base module, if any, may be constructed with the top end only (S3) and the top module, if any, may be constructed with the bottom end only (S6).

After the modules necessary to make up the mast have been obtained with the processes described herein, their truncated cone-shaped terminal parts (S3, S6) must be prepared for adhesive bonding, following the procedures recommended for the adhesive used. On the "male" terminal parts (S3) the external surface must be prepared, while the internal surface must be prepared on the "female" terminal parts (S6).

After preparing the terminal parts (S3, S6) of each module for adhesive bonding, the modules must be aligned, for example by resting them on stands, in a predetermined order, for example with the base module on one side, the top module on the opposite side and the intermediate modules in the middle, with any modules provided with couplings for the support cables or for the sailing equipment in the positions required by the structure of the mast to be carried out.

Figure 4:
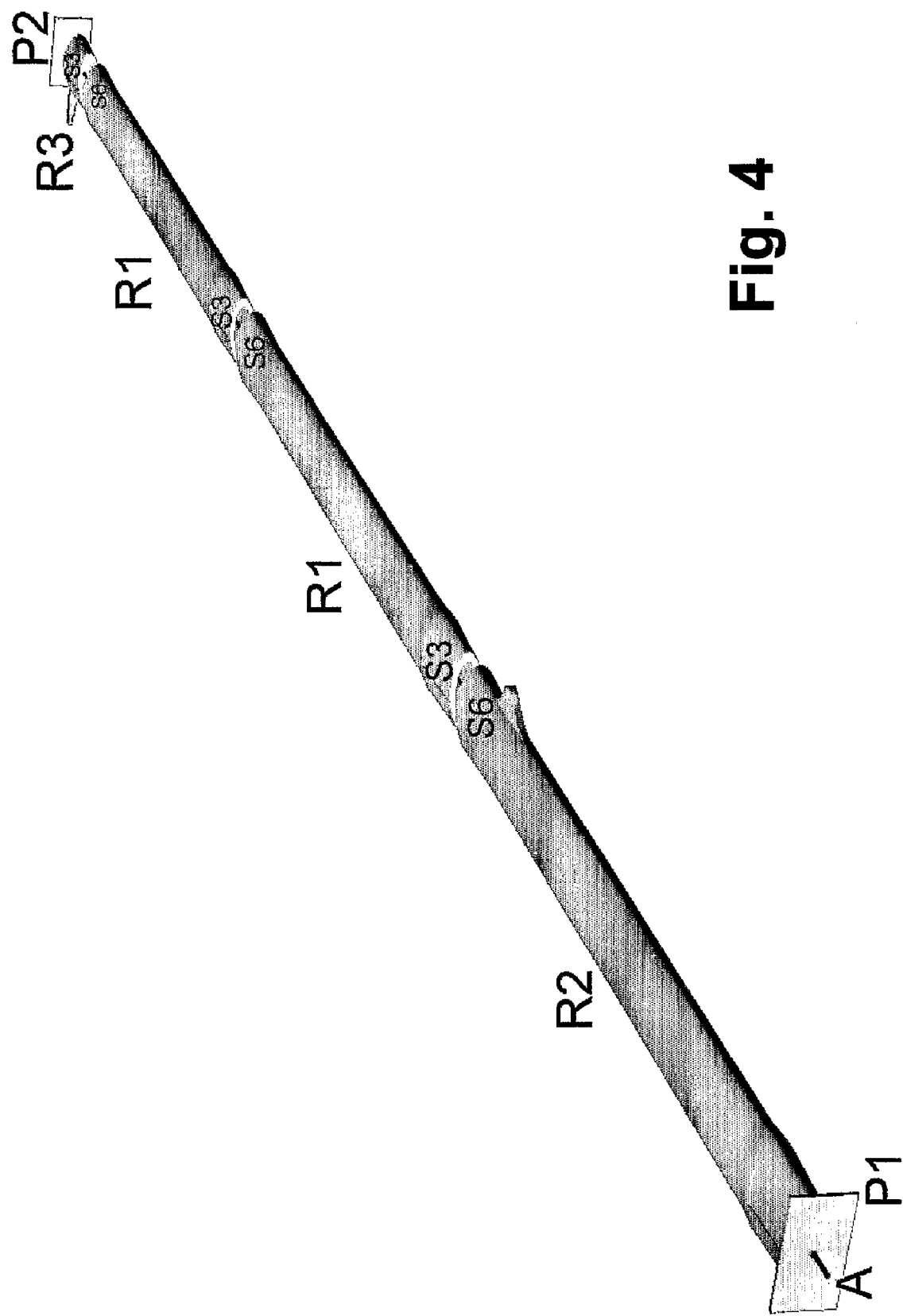
FIG. 4 shows a possible alignment of and means of compressing multiple modules to make a mast according to the present invention.

FIG. 4 shows, by way of example only, a possible alignment with a base module (R3), provided with the male terminal part (S3) only, two equal modules (R1), each provided with a male terminal part (S3) and a female terminal part (S6), and a module provided with couplings for the mast support cables (R2), with a female (S6) and a male terminal part (S3), not indicated in the figure as it is not utilized due to the absence of other modules to be joined.

With the modules aligned in the correct order, the adhesive must be applied to all the truncated cone-shaped terminal parts (S3, S6) and a traction cable or rod (A) will be made slide inside each module, the length of said traction cable or rod being sufficient to cover the entire inner cavity of the mast when the modules are adjacent to one another, but haven't been joined yet.

Said traction cable or rod (A) must be provided with a device suited to exert a controlled tension, by acting on the mast ends, which therefore will be compressed accordingly. A suitable device, proposed herein as a non-exclusive solution, is constituted by two threaded bars, applied to the ends of the cable, or by a thread on the whole rod or its ends. After making said traction cable or rod slide inside the series of aligned modules, the threaded ends must be passed through two plates (P1, P2), each one provided with a central hole and having dimensions sufficient to rest on the entire perimeter of the two ends of the mast, and/or being provided with seats specifically designed for this purpose. The plates, however, must be positioned in such a way as to transfer to the mast a compression force parallel to the longitudinal axis of the mast itself.

Successively the various modules can be brought in contact with one another by hand, inserting the "male" truncated cone-shaped terminal parts (S3) into the adjacent "female" terminal parts (S6) and compressing them towards one another as much as possible (FIG. 5).

Once the preliminary coupling of all the modules has been completed, two nuts must be inserted in the threaded ends of the traction cable or rod (A). Said nuts will be tightened against the two plates (P1, P2), thus increasing the tension of the traction cable or rod. Said tension can be easily controlled by adjusting the nut driving torque by means of a torque wrench.

The tension of the traction cable or rod is transferred, through the 2 plates (P1, P2), to the series of modules laid one after the other, acting as an axial compression on the mast. A possible variant to the use of the internal cable or rod is the use of a device external to the column, suitable for the application of a controlled axial compression to the column itself.

The taper of the terminal parts (S3, S6) makes the axial compression act on the coupling areas as a pressure perpendicular and radial to the walls. This pressure compresses the outside of the walls of the male terminal part (S3) against the inside of the walls of the female terminal part (S6).

If the taper is the same for all the truncated cone-shaped terminal parts, the pressure perpendicular to the walls will be the same on each coupling area. In this way, by assigning a suitable taper angle to the terminal parts, for example 2°, it is possible to calculate the mathematical relation between the axial compression applied to the mast by the traction cable or rod (A) and the pressure perpendicular and radial to the walls of the terminal parts.

The pressure between the walls to be glued is necessary to ensure: 1) the contact between the walls themselves and therefore between the fibers of the laminate, without interposition of excessively thick layers of glue; 2) the elimination of excess adhesive at the end of the coupling areas; 3) the elimination of any air bubbles present between the walls of the terminal parts; 4) the axial centering of the various modules. Points 1), 2) and 3) represent some of the fundamental factors to ensure that the connection of the parts by adhesive bonding achieves the best mechanical characteristics obtainable with the adhesive used. If these conditions are respected and if the adhesive used has sufficient mechanical characteristics, it is possible to ensure that the mechanical resistance of the glued terminal parts is equal to or higher than that of the connected modules.

The pressure suitable to achieve the aims 1), 2) and 3) must be verified with the manufacturer of the adhesive, but the invention described herein, through the control of the taper angle of the terminal parts of the modules (S3, S6) and of the nut driving torque, allows said pressure to be easily exerted by using the simple equipment described above. The use of the truncated cone-shaped terminal parts described herein also makes it possible to achieve the aim 4), with no need to make use of sophisticated supports to keep the modules perfectly aligned during adhesive bonding. Thanks to the taper of the terminal parts, the various modules align spontaneously along the axis of the mast, without any tendency to bend sideward or verticallyupward.

It is sufficient to support the aligned modules with simple stands, or to rest them on the ground, to eliminate the effect of their dead load and ensure the rectilinear assembly of the mast.

Thanks to this property of the tapered terminal parts, it is possible to avoid the use of any type of template or support for the correct assembly of the column and there is no need to check the alignment of separate elements of the column, which on the other hand is necessary if the elements are divided along a direction parallel to the axis of the column. After carrying out the coupling described herein and tightening the nuts with the calculated torque, it is possible to subject the adhesive to heat treatment, if required. For this purpose it is not necessary to heat the whole mast, since the parts to be treated are only the terminal parts (S3, S6) between the modules. The scarce heat conductivity of the common resins and fibers used in the manufacture of composite materials limits the dispersion of the heat applied to the terminal parts and therefore also the energy necessary to achieve the required temperature.

To increase the temperature of the terminal parts during the treatment/curing of the adhesive it is possible, among other methods, to use heating blankets, if necessary wrapping the terminal parts with layers of heat insulating material.

Therefore, with reference to the above description and the enclosed drawings, the following claims are expressed.

The invention claimed is:

1. A process of producing a hollow column or rod comprising:
  providing a plurality of hollow elongated modules made from fiber-reinforced resin and having central portions of substantially constant cross-sections, each of the modules having at least one of a male or female terminal portion, wherein the male terminal portion comprises a base having a cross-section wider than the central portions and an inwardly tapered extension protruding from the base and radially recessed from the base, and wherein the female portion comprises an outwardly tapered extension having a free end with a cross section wider than the central portions and dimensioned to mate with the male terminal portion such to provide the column or rod with a flush outer profile;
  aligning the modules axially causing each male portion to face one female portion;
  disposing an adhesive product on at least a portion of one or more of the male and female portions;
  mating the male portions with the female portions by applying a compressive force against free ends of the first and last modules and causing contact between the male portions, the adhesive product, and the female portions; and
  causing the adhesive product to cure.

2. The process of claim 1, wherein applying the compressive force comprises:
  disposing a member axially within the aligned modules;
  providing a compressive element against each of the free ends of the first and last modules; and causing the compressive elements to apply the compressive force by causing the member to draw the compressive elements one closer to the other.

3. The process of claim 2, wherein the compressive elements are plates wider than an outer diameter of a facing module end and the member is a cable or rod having one or more extensions that are at least partially threaded, and wherein the free ends of the first and last modules have an opening for passage of the cable or rod.

4. The process of claim 1, wherein the male and female portions have lengths and cross-sections dimensioned to carry a predetermined design load.

5. The process of claim 1, wherein the male and female portions are configured to distribute a load on the column or rod into predetermined longitudinal and radial loads at the mated male and female portions.

6. The process of claim 1, wherein the male and female portions have tapers of such lengths and angles to provide a spontaneous axial alignment of the plurality of modules upon the applying of the compressive force.

7. The process of claim 1, wherein the male terminal portion further comprises a radially extending wall providing a local reinforcement that increases stability of the hollow column or rod.

8. The process of claim 1, wherein applying the compressive force comprises applying a controllable compressive force.

9. The process of claim 1, wherein applying the compressive force comprises applying the compressive force with a device external to the hollow column or rod.

10. The process of claim 1, further comprising providing one or more of the modules with one or more elements enabling connection of the hollow column or rod with an external member.

11. The process of claim 10, wherein the hollow column or rod is a mast, and wherein the one or more elements comprise a coupling for a mast support cable or for sailing equipment.

12. The process of claim 1, wherein providing the plurality of the hollow elongated modules comprises providing the hollow elongated modules manufactured with a process selected from the group consisting of autoclave molding, vacuum molding, filament winding, manual impregnation, and thermoplastic molding.

13. The process of claim 1, wherein providing the plurality of the hollow elongated modules comprises manufacturing the hollow elongated modules with a method comprising the steps of:
providing a first mold and a second mold each having a cavity equal to a longitudinal half of one of the hollow elongated modules;
laying up layers of the fiber-reinforced resin on the cavities of the first and second molds, the layers in the first mold extending substantially to longitudinal edges of the cavity of the first mold, the layers in the second mold extending beyond the cavity of the second mold;
disposing a tubular vacuum bag over the layers in the second mold, the tubular vacuum bag having ends vented to an outside environment;
coupling the first mold with the second mold, so to cause the first and the second cavities to be in facing relationship;
drawing vacuum between the tubular vacuum bag and the first and the second cavities, so to remove air between the tubular vacuum bag and the first and the second cavities and to cause the outside environment to apply a pressure differential on the fiber-reinforced resin; and
curing the fiber-reinforced resin in an autoclave.

14. The process of claim 13, further comprising the steps of disposing a second vacuum bag over at least a portion of the first and the second molds and of sealingly coupling the tubular and the second vacuum bags.

15. The process of claim 14, wherein the tubular and the second vacuum bags are a single vacuum bag configured to form a tubular part between the cavities of the first and second molds, and a second part surrounding the first and the second molds.

16. A hollow column or rod comprising:
a plurality of hollow elongated modules made from fiber-reinforced resin and having central portions of substantially constant cross-sections, each of the modules having at least one of a male or female terminal portion,
wherein the male terminal portion comprises a base having a cross-section wider than the central portions and an inwardly tapered extension protruding from the base and radially recessed from the base,
wherein the female portion comprises an outwardly tapered extension having a free end with a cross section wider than the central portions and dimensioned to mate with the male terminal portion such to provide the column or rod with a flush outer profile, and
wherein the modules are aligned axially with each male portion facing a female portion, and are joined one to the other with an adhesive product provided between the male and the female portions by applying a compressive force against free ends of the outermost modules that causes a contact between the male terminal portion, the adhesive, and the female portion.

17. The hollow column or rod of claim 16, wherein the male and female portions are configured to distribute a load on the column or rod into predetermined longitudinal and radial loads at the mated male and female portions.

18. The hollow column or rod of claim 16, wherein the male terminal portion further comprises a radially extending wall providing a local reinforcement that increases stability of the hollow column or rod.

19. The hollow column or rod of claim 16, further comprising providing one or more of the modules with one or more elements enabling connection of the hollow column or rod with an external member.

20. The process of claim 19, wherein the hollow column or rod is a mast, and wherein the one or more elements comprise a coupling for a mast support cable or for sailing equipment.

* * * * *